US012643091B2

(12) United States Patent
Park et al.

(10) Patent No.: US 12,643,091 B2
(45) Date of Patent: Jun. 2, 2026

(54) DEHYDROGENATION CATALYST FOR PRODUCING OLEFINS FROM ALKANE GAS AND PREPARATION METHOD THEREOF

(71) Applicants:SK GAS CO., LTD., Seongnam-si (KR); KOREA RESEARCH INSTITUTE OF CHEMICAL TECHNOLOGY, Daejeon (KR)

(72) Inventors: Deuk Soo Park, Seongnam-si (KR); Ung Gi Hong, Seongnam-si (KR); Hae Bin Shin, Seongnam-si (KR); Daesung Park, Daejeon (KR); Hawon Park, Daejeon (KR); Changyeol Song, Daejeon (KR); Won Choon Choi, Daejeon (KR); Yong Ki Park, Seoul (KR)

(73) Assignees: SK GAS CO., LTD., Seongnam-si (KR); KOREA RESEARCH INSTITUTE OF CHEMICAL TECHNOLOGY, Daejeon (KR)

( * ) Notice: Subject to any disclaimer, the term of this patent is extended or adjusted under 35 U.S.C. 154(b) by 785 days.

(21) Appl. No.: 17/776,432

(22) PCT Filed: Nov. 24, 2020

(86) PCT No.: PCT/KR2020/016632
§ 371 (c)(1),
(2) Date: May 12, 2022

(87) PCT Pub. No.: WO2021/107541
PCT Pub. Date: Jun. 3, 2021

(65) Prior Publication Data
US 2022/0401930 A1 Dec. 22, 2022

(30) Foreign Application Priority Data
Nov. 27, 2019 (KR) ........................ 10-2019-0154018

(51) Int. Cl.
*B01J 23/75* (2006.01)
*B01J 21/04* (2006.01)
(Continued)

(52) U.S. Cl.
CPC ........... *B01J 23/80* (2013.01); *B01J 37/0201* (2013.01); *B01J 37/0236* (2013.01); *B01J 37/04* (2013.01); *B01J 37/088* (2013.01)

(58) Field of Classification Search
CPC ........ B01J 23/06; B01J 23/80; B01J 37/0201; B01J 37/0236; B01J 37/04; B01J 37/088;
(Continued)

(56) References Cited

U.S. PATENT DOCUMENTS 3,433,851 A * 3/1969 Keblys ..................... B01J 21/04
585/662
3,444,256 A * 5/1969 Engelhard ................. C07C 5/02
208/143
(Continued)

FOREIGN PATENT DOCUMENTS

CN 105438568 A 3/2016
KR 10-0817465 B1 3/2008
(Continued)

OTHER PUBLICATIONS

Thomas et al. (Genesis of Zinc-Cobalt Promoted Hydrotreating Catalysts: Adsorption Isotherms of Zn and/or Co on Al2O3), J. Chem. Soc. Faraday Trans., 1990, 86(15), 2765-2773.*
(Continued)

*Primary Examiner* — Cam N. Nguyen
(74) *Attorney, Agent, or Firm* — Paratus Law Group, PLLC

(57) ABSTRACT
A dehydrogenation catalyst for producing olefins from alkane gases, in which cobalt and zinc are supported on alumina. A method for preparing the dehydrogenation cata-
(Continued)

lyst for producing olefins from alkane gases, includes: preparing a mixed solution by mixing cobalt and zinc precursors with water; preparing a supported catalyst by impregnating alumina with the mixed solution; drying the supported catalyst; and calcining the dried supported catalyst at 500° C. to 900° C.

12 Claims, 4 Drawing Sheets

(51) Int. Cl.

| | | |
|---|---|---|
| *B01J 23/06* | (2006.01) | |
| *B01J 23/80* | (2006.01) | |
| *B01J 23/825* | (2006.01) | |
| *B01J 23/94* | (2006.01) | |
| *B01J 37/02* | (2006.01) | |
| *B01J 37/04* | (2006.01) | |
| *B01J 37/08* | (2006.01) | |
| *B01J 38/02* | (2006.01) | |
| *B01J 38/12* | (2006.01) | |
| *C07C 5/333* | (2006.01) | |
| *C07C 11/04* | (2006.01) | |
| *C07C 11/06* | (2006.01) | |

(58) Field of Classification Search
CPC ........ B01J 23/75; B01J 23/002; B01J 23/825; B01J 23/94; B01J 38/02; B01J 38/12; B01J 37/08; B01J 21/04; C07C 5/333; C07C 11/04; C07C 11/06; C07C 5/3335; C07C 2523/80
USPC ....... 502/307, 327, 329, 332, 342, 343, 355, 502/415
See application file for complete search history.

(56) References Cited

U.S. PATENT DOCUMENTS

| | | | | |
|---|---|---|---|---|
| 3,798,156 | A | * | 3/1974 | Hensley, Jr. ........... B01J 23/882 |
| | | | | 200/10 |
| 3,988,263 | A | * | 10/1976 | Hansford ................. B01J 23/06 |
| | | | | 518/715 |
| 4,216,346 | A | | 8/1980 | Antos |
| 4,280,930 | A | * | 7/1981 | Antos .................. B01J 23/8953 |
| | | | | 502/326 |
| 4,389,305 | A | * | 6/1983 | Gardner ................. C10G 45/04 |
| | | | | 208/254 H |
| 4,529,718 | A | * | 7/1985 | Dupin .................... B01J 35/615 |
| | | | | 502/355 |
| 4,835,127 | A | | 5/1989 | Eastman et al. |
| 6,007,700 | A | * | 12/1999 | Alario .................. B01J 23/6567 |
| | | | | 585/419 |
| 6,218,335 | B1 | * | 4/2001 | Okada .................. C01G 53/006 |
| | | | | 501/118 |
| 6,369,000 | B1 | * | 4/2002 | Johnson ................... B01J 23/06 |
| | | | | 502/439 |
| 7,582,202 | B2 | * | 9/2009 | Jones ..................... C10G 11/05 |
| | | | | 502/343 |
| 8,088,708 | B2 | * | 1/2012 | Takatsu .................. B01J 35/393 |
| | | | | 429/502 |
| 2013/0165729 | A1 | * | 6/2013 | Selvanathan ............ B01J 23/00 |
| | | | | 585/663 |
| 2017/0120222 | A1 | * | 5/2017 | Kim ......................... B01J 23/63 |

FOREIGN PATENT DOCUMENTS

| | | |
|---|---|---|
| KR | 10-2014-0108264 A | 9/2014 |
| KR | 10-2018-0133696 A | 12/2018 |
| WO | WO 2004/060839 A1 | 7/2004 |

OTHER PUBLICATIONS

International Search Report for PCT/KR2020/016632 mailed Mar. 11, 2021 from Korean Intellectual Property Office.

\* cited by examiner

DEHYDROGENATION CATALYST FOR PRODUCING OLEFINS FROM ALKANE GAS AND PREPARATION METHOD THEREOF

CROSS-REFERENCE TO PRIOR APPLICATIONS

This application is a National Stage Patent Application of PCT International Patent Application No. PCT/KR2020/016632 (filed on Nov. 24, 2020) under 35 U.S.C. § 371, which claims priority to Korean Patent Application No. 10-2019-0154018 (filed on Nov. 27, 2019), which are all hereby incorporated by reference in their entirety.

BACKGROUND

The present disclosure relates to a catalyst for olefin production having improved selectivity and conversion rate compared to the conventional art in the production of olefins from alkane gases such as ethane, propane, butane, and the like, and a preparation method thereof.

Olefins such as ethylene and propylene are widely being used in the petrochemical industry. In general, these olefins are obtained in the pyrolysis process of naphtha. However, since a larger amount of olefin is required in the petrochemical industry, olefins are also produced through the dehydrogenation process of lower hydrocarbons using a catalyst.

The existing propane dehydrogenation (PDH) commercial process typically includes a fixed-bed reactor and a moving-bed reactor.

In contrast, there have been no commercialization cases in PDH technology (FPDH, fast-fluidized propane dehydrogenation) using a high-speed fluidized bed (hereinafter referred to as fluidized bed) reactor until now.

The biggest difference between the fixed-bed reactor and the fluidized bed reactor is a contact time of the catalyst and the reactant (propane). In other words, the fluidized bed reactor is a process in which propane and a catalyst are together injected into the fluidized bed reactor at a very high rate to perform the reaction, the catalyst enters the regeneration unit, and the product enters the separation unit.

The goal of the FPDH process that has conventionally been developed is to set the residence time of a catalyst to 10 seconds or less. If the residence time of the catalyst is short, the injection rate of the supply amount of propane is also fast, and the catalyst is immediately regenerated and participates in the reaction again. Therefore, when the FPDH process is developed as a commercial process, propylene output is greatly increased compared to the fixed bed process.

However, since the contact time between the catalyst and propane is that short, the efficiency of the catalyst becomes very important. In other words, it is important to maximize the selectivity and conversion rate, which are two efficiency measures of the catalyst, respectively.

Furthermore, since the propane dehydrogenation process technologies that are currently being used are configured based on noble metal catalysts or a discontinuous process, they are experiencing difficulties in propylene production operation such as a reactor clogging phenomenon due to excessive activity of noble metal catalysts (coke production), fixed-bed reactor valve sequence trouble, and the like.

Further, the propane dehydrogenation reaction has a thermodynamic limitation on the propane conversion rate due to the reversible reaction by hydrogen, and most processes convert hydrogen into water using an external oxidizing agent such as oxygen, halogen, sulfur compounds, carbon dioxide, water vapor, or the like in order to overcome such problems.

Therefore, in order to effectively mass-produce propylene, the development of a new propane dehydrogenation process with reduced production cost by solving the problem of the continuous process and using a non-noble metal direct dehydrogenation catalyst without an oxidizing agent is required.

The reaction proceeds with a direct dehydrogenation mechanism in which hydrogen is adsorbed at active sites in the case of a noble metal catalyst among the catalysts used for propane dehydrogenation, but the mechanism has not been clearly elucidated due to incompleteness of the active sites due to electron mobility in the case of transition metal oxides.

Under these circumstances, the most commonly used catalysts as PDH catalysts include Pt, Pt—Sn, VOx, and CrOx catalysts. Although the CrOx catalyst is very excellent in terms of propane conversion rate and selectivity, its use is limited due to problems such as environmental pollution and harm to the human body, and difficulties in controlling the oxidation reaction in the initial stage of the reaction. The Pt catalyst has excellent selectivity, but is expensive, and the coke production rate is very high so that fine control thereof is required.

Meanwhile, in the case of Patent Document 1 (Korean Patent No. 817465) and Patent Document 2 (Chinese Patent No. 105438568), noble metals are still used as active materials, and further, in the case of Patent Document 2, a second catalyst layer is further included, but the catalyst according to the present disclosure is not recognized at all.

Accordingly, the present inventors have developed a catalyst for producing olefins, which has excellent catalyst conversion rate and selectivity at the same time, and a preparation method thereof by introducing a new catalyst that does not contain noble metals and chromium through continuous research, thereby discovering that the problems occurred in the conventional art could be solved.

SUMMARY

It is an object of the present disclosure to provide a catalyst for olefin production, which is eco-friendly and excellent in conversion rate and selectivity in the production of olefins from alkane gases such as ethane, propane, butane, and the like, and a preparation method thereof.

A catalyst for producing olefins from alkane gases according to the present disclosure is a dehydrogenation catalyst in which cobalt and zinc are supported on alumina.

The catalyst is preferably calcined at 500° C. to 900° C., more preferably higher than 650° C. and lower than 800° C.

Cobalt is preferably supported in an amount of 1 to 7% by weight, more preferably 3 to 4.5% by weight.

Zinc is preferably supported at a molar ratio of 0.1 to 2.5, more preferably 0.5 to 2.5, with respect to cobalt.

In another aspect of the present disclosure, a method for preparing a dehydrogenation catalyst for producing olefins from alkane gases according to the present disclosure comprises the steps of: preparing a mixed solution by mixing cobalt and zinc precursors with water;

preparing a supported catalyst by impregnating alumina with the mixed solution;

drying the supported catalyst; and calcining the dried supported catalyst at 500° C. to 900° C., more preferably higher than 650° C. and lower than 800° C.

The catalyst for producing olefins from alkane gases such as ethane, propane, butane, and the like according to the present disclosure and the preparation method thereof are eco-friendly and have excellent conversion rate and selectivity, thereby enabling the realization of the FPDH process which is effective in both fixed-bed reactors and fluidized bed reactors, but particularly has not been commercially realized in the conventional art.

DETAILED DESCRIPTION

Figure 1:
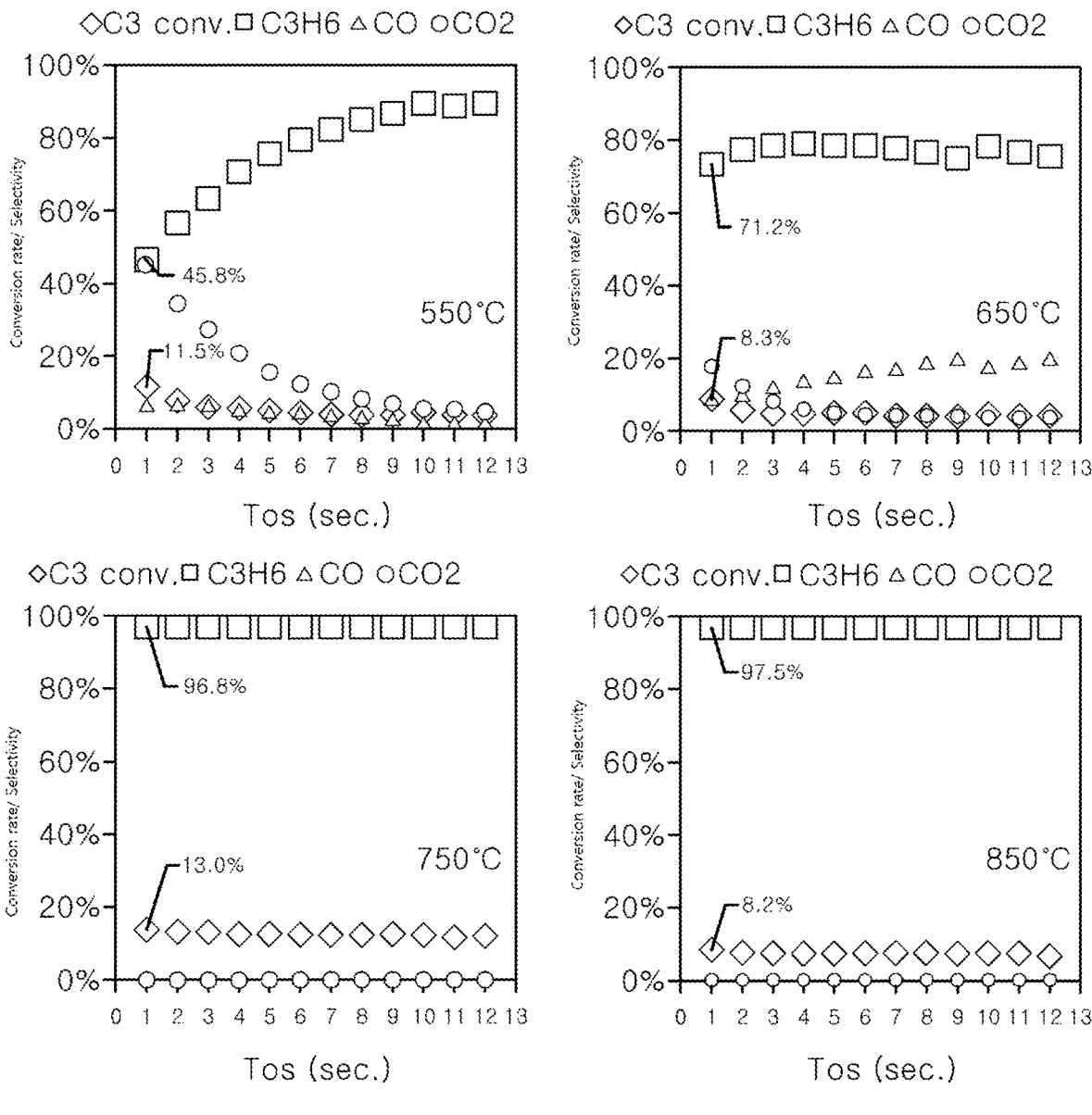
FIG. 1 schematically shows the conversion rate and selectivity depending on the calcination temperature of a catalyst in which 3% by weight of cobalt is supported on alumina.

The catalyst for producing olefins from alkane gases according to the present disclosure is a dehydrogenation catalyst in which cobalt and zinc are supported on alumina.

Hereinafter, preferred embodiments of the present disclosure will be described with reference to the accompanying drawings. However, the embodiments of the present disclosure may be modified in various other forms, and the scope of the present disclosure is not limited to the embodiments described below.

In describing the present embodiments, the same names and reference numerals are used for the same configurations, and thus overlapping additional descriptions are omitted below. In the drawings referenced below, no scale ratio applies.

The catalyst for producing olefins from alkane gases such as ethane, propane, butane, and the like according to the present disclosure is a dehydrogenation catalyst in which cobalt and zinc are supported on alumina.

The alumina support preferably has a γ to θ phase at a preparation temperature of 550 to 850° C. that is a dehydrogenation reaction temperature or higher, and has a surface area of 80 to 300 m²/g in this range.

If the support is prepared at a temperature lower than the dehydrogenation reaction temperature, thermal deformation of the catalyst may occur during the dehydrogenation reaction, and when the support is prepared at a temperature exceeding 900° C., the support has a low catalyst surface area due to crystallization of the support, which impedes mass transfer for catalytic activity upon contact with reactants.

Traditionally, active metals for dehydrogenation catalysts are varied, but cobalt is preferable in order to obtain high selectivity in the very early stage of the reaction within several seconds, which is characteristic of the FPDH process, and furthermore, zinc is preferable as a cocatalyst in order to improve the conversion rate while maintaining high selectivity properties of a cobalt-based catalyst.

For example, platinum is too expensive; chromium has a problem with the environmental hazards of hexavalent chromium; molybdenum causes too many side reactions, which reduces selectivity; and vanadium has a low melting point so that it is not suitable for a high-speed/high-temperature fluidized bed reaction. Further, when gallium or zirconium is used as a cocatalyst, both conversion rate and selectivity have not been satisfied.

The catalyst is preferably calcined at 500° C. to 900° C., more preferably higher than 650° C. and lower than 800° C. In the catalyst, the catalyst phase changes depending on the calcination temperature, and the catalyst is not preferable as a dehydrogenation catalyst since it forms a nano-sized crystal phase outside the above temperature range, thereby mainly causing a redox reaction.

Cobalt is preferably supported in an amount of 1 to 7% by weight, more preferably 3 to 4.5% by weight. The amount of cobalt species outside the above range is outside the commercially applicable range for FPDH. Further, since a crystalline oxide is formed when the amount of cobalt species is large, which causes negative effect on dehydrogenation reaction. Furthermore, when the amount of cobalt species is increased beyond the above range, the yield is remarkably decreased.

Zinc is preferably supported at a molar ratio of 0.1 to 2.5, more preferably 0.5 to 2.5 with respect to cobalt. As the amount of zinc to cobalt increases, the conversion rate increases without a change in the selectivity, but since the conversion rate decreases as the molar ratio exceeds 2.5, the above range is preferable from a commercial point of view.

In another aspect of the present disclosure, the method for preparing a dehydrogenation catalyst for olefin production according to the present disclosure comprises the steps of:

preparing a mixed solution by mixing cobalt and zinc precursors with water;

preparing a supported catalyst by impregnating alumina with the mixed solution;

drying the supported catalyst; and calcining the dried supported catalyst at 500° C. to 900° C., more preferably higher than 650° C. and lower than 800° C.

Conventionally, catalysts synthesized by the sol-gel method and the precipitation method, which are expected to have high crystallinity, are not preferable since $CO_2$ production is mainly due to oxidation reaction rather than dehydrogenation reaction. On the other hand, in the case of a mesopore catalyst by EISA method, which is a synthesis method with an increased ratio of alumina, or a catalyst synthesized by a precipitation method on an alumina solid slurry, the acid sites of the alumina support may be appropriately controlled, thereby increasing the selectivity of the dehydrogenation reaction.

Hereinafter, the present disclosure will be described in more detail through Preparation Example and Example.

Production Example

1. Preparation of Cobalt Catalysts With Various Contents (XCo/Alumina, X=1 to 15% by Weight)

In order to impregnate a metal oxide, after 1 to 15% by weight of $Co(NO_3)_2 \cdot 6H_2O$ (cobalt nitrate hexahydrate) was first added to 2.5 g of water based on 5 g of alumina and sufficiently dissolved therein, a solution was prepared. The solution prepared above was added to 5 g of alumina, impregnated by incipient wetness impregnation, dried at 75° C. for 12 hours, and then calcined at a temperature increase rate of 1° C. per minute in a calcining temperature range of 500° C. to 900° C. for 6 hours.

2. Preparation of Cocatalyst-Added Cobalt Alumina Catalyst (Co—Zn/Alumina, Co—, Zr/Alumina, Co—Ga/Alumina)

A cocatalyst was added in a preparation process similar to that of Preparation Example 1 above. First, 1 to 7% by weight of Co(NO₃)₂·6H₂O (cobalt nitrate hexahydrate) based on 5 g of alumina and Zn(NO₃)₂·6H₂O (zinc nitrate hexahydrate) by 0.1 to 2.5 times the number of moles of cobalt were subjected to co-impregnation in 2.5 g of water to prepare a cobalt-zinc oxide solution. In this way, a cobalt-zirconium oxide solution was prepared by co-precipitating ZrO(NO₃)₂ (zirconium oxynitrate) by 0.1 to 2 times the number of moles of cobalt, and a cobalt-gallium oxide solution was prepared by co-precipitating Ga(NO₃)₃·xH₂O (gallium nitrate hydrate) by 0.1 to 2.5 times the number of moles of cobalt. Each of the metal oxide solutions prepared above was added to 5 g of alumina, impregnated by incipient wetness impregnation, dried at 75° C. for 12 hours, and then calcined at a temperature increase rate of 1° C. per minute at a calcining temperature of 750° C. for 6 hours.

<Conversion Rate and Selectivity Experiment>

After injecting 0.4 g of the prepared catalyst into a fixed-bed type reactor, the reaction and regeneration temperature in an inert gas atmosphere of helium gas was reached to 600° C. at a temperature increase rate of 10° C. per minute. Thereafter, it was reduced with a mixed gas (50% propane/50% nitrogen) of 105 mL/min for 16 seconds, and subjected to the regeneration process in an air atmosphere of 30 ml/min. Next, after removing oxygen adsorbed to the reactor and catalyst for 20 minutes using helium gas, a 50% propane/nitrogen mixed gas was injected at a flow rate of 105 mL/min to perform the reaction at a weight hourly space velocity (WHSV) of 16 h⁻¹. The reaction product was collected every second in the 16-port valve and analyzed through gas chromatography.

First, looking at the catalyst in which 3% by weight of cobalt is supported on alumina according to the calcining temperature, it can be seen that the selectivity and conversion rate are preferable even at 500° C. to 900° C., but the selectivity and conversion rate are remarkably deteriorated at 650° C. and 850° C. as shown in FIG. 1.

Figure 2:
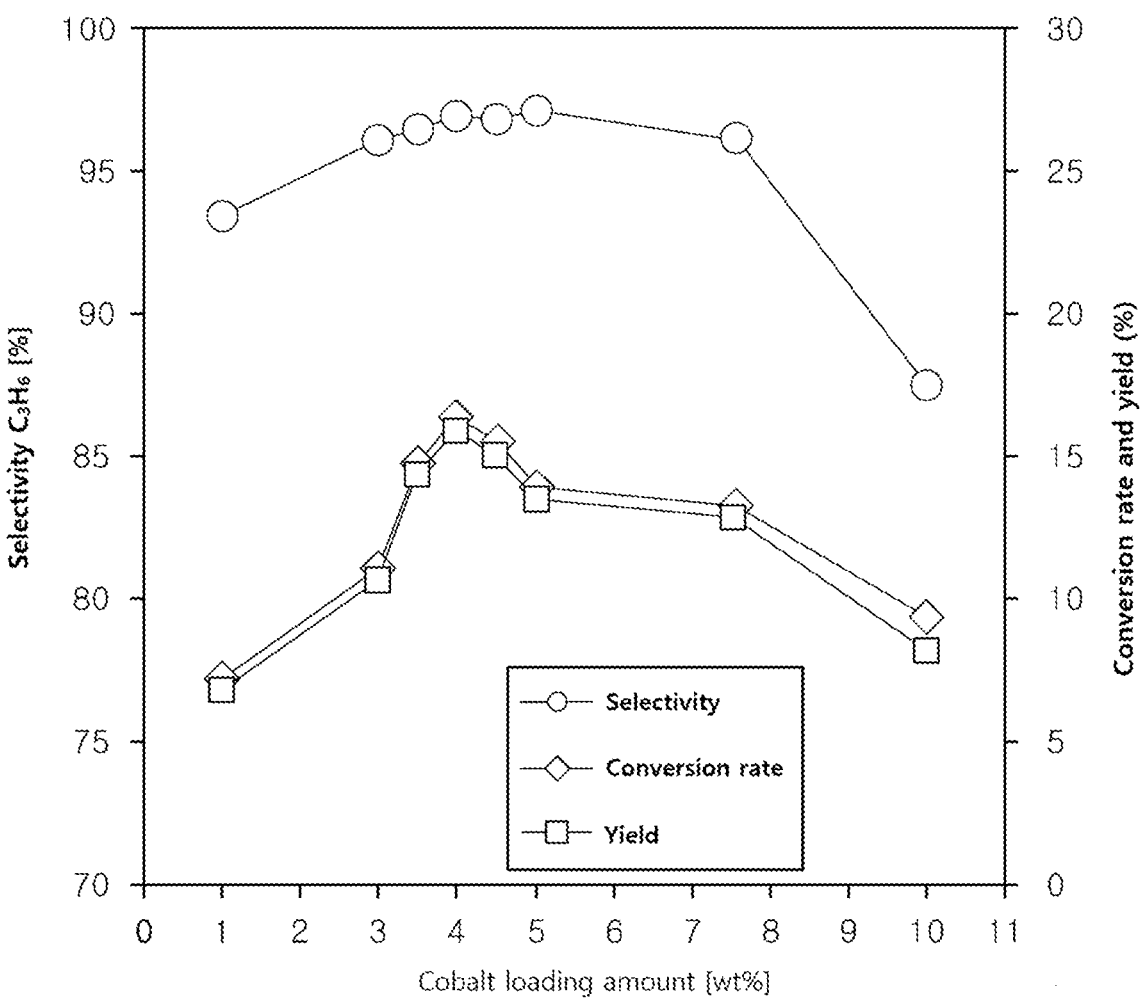
FIG. 2 schematically shows the conversion rate and selectivity of the catalyst depending on the loading amount of cobalt.

Further, looking at the selectivity and conversion rate according to the cobalt loading amount, it can be seen that both the selectivity and the conversion rate are preferable when the cobalt loading amount is 1 to 7% by weight as shown in FIG. 2.

Figure 3:
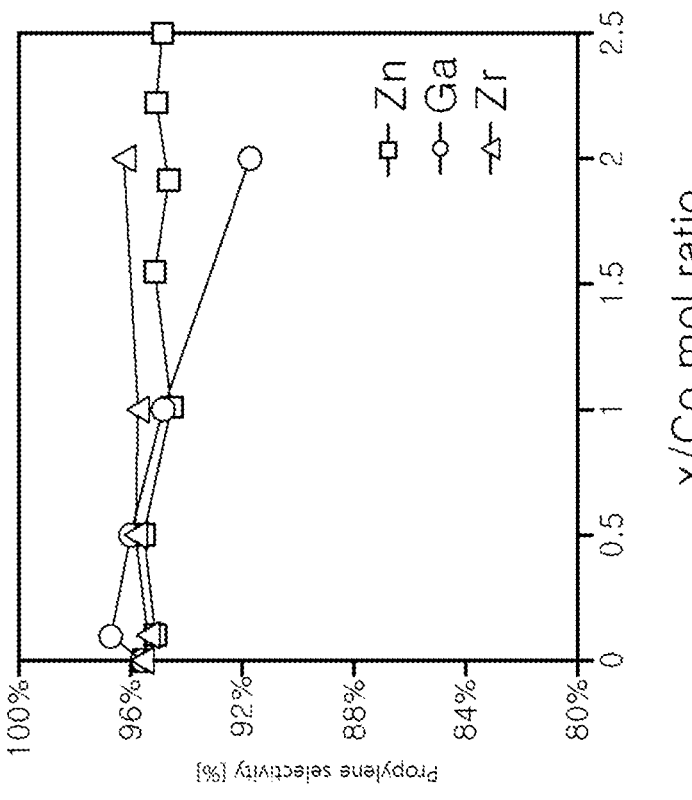
FIG. 3 schematically shows the conversion rate and selectivity of the catalyst depending on the loading amount of the cocatalyst.

Further, looking at FIG. 3 showing the selectivity and conversion rate according to the loading amount (molar ratio to cobalt) of the cocatalyst, zinc was preferable in both conversion rate and selectivity. In particular, the case where the molar ratio of the loading amount of zinc to cobalt was 0.5 to 2.5 was more preferable.

Figure 4:
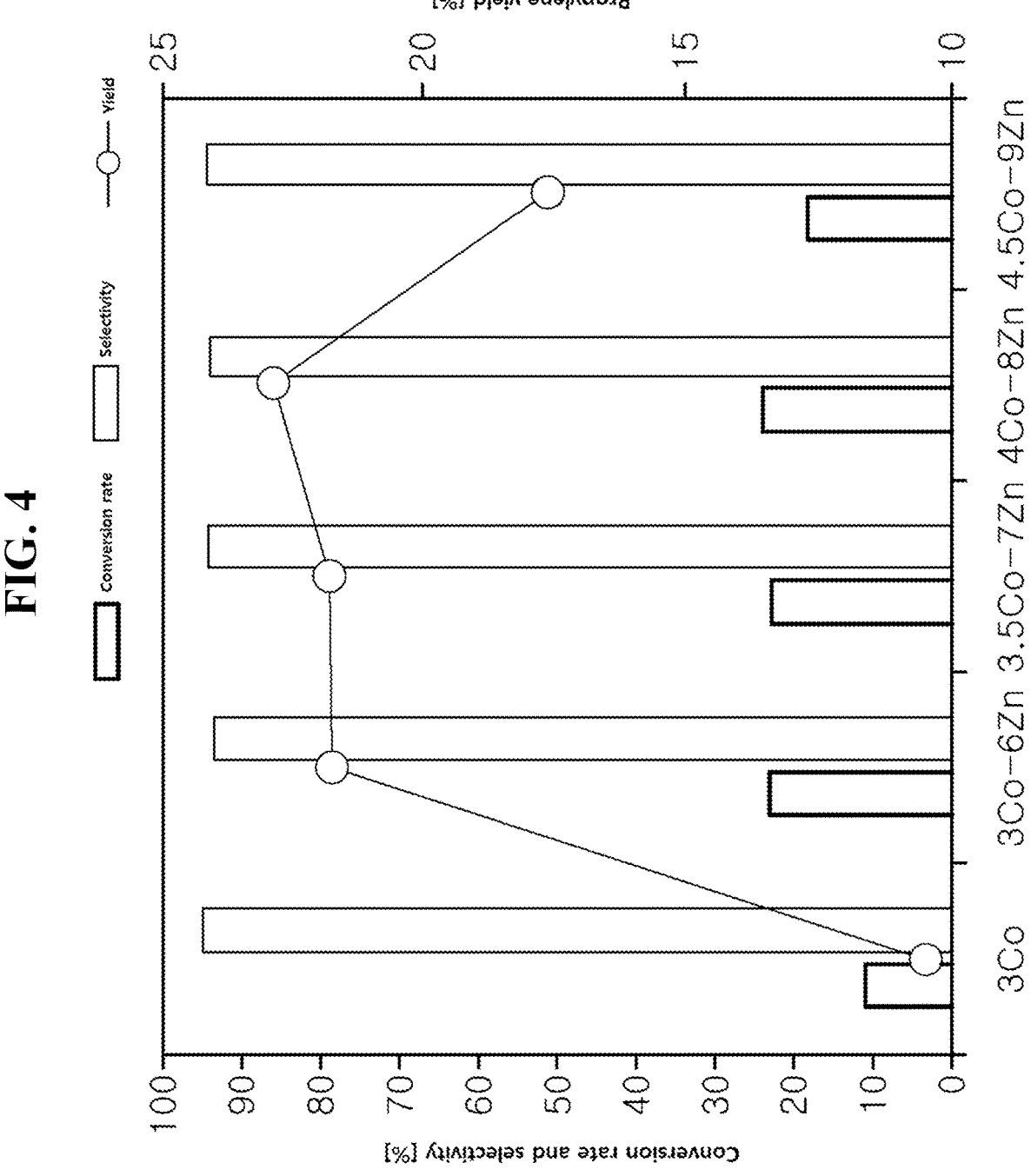
FIG. 4 schematically shows the conversion rate, selectivity, and yield in which the molar ratio of zinc and cobalt is fixed to 2 and the loading amount of cobalt is changed.

Furthermore, as shown in FIG. 4 when the molar ratio of zinc and cobalt was fixed to 2 and the loading amount of cobalt was changed, the yield was significantly reduced when the loading amount of cobalt exceeded 4.5% by weight. Therefore, in spite of the result of FIG. 2, the loading amount of cobalt of 3 to 4.5% by weight was more preferably.

Hereinabove, the embodiments of the present disclosure have been described in detail, but the scope of rights of the present disclosure is not limited thereto, and it will be apparent to those with ordinary skill in the art that various modifications and variations are possible within the scope without departing from the technical spirit of the present disclosure described in the claims.

The present disclosure relates to a catalyst for olefin production having improved selectivity and conversion rate compared to the conventional art in the production of olefins from alkane gases such as ethane, propane, butane, and the like, and a preparation method thereof.

The invention claimed is:

1. A dehydrogenation catalyst for producing olefins from alkane gases, in which cobalt and zinc are supported on alumina, wherein the catalyst contains no noble metals or chromium, and wherein cobalt is supported in an amount of 3 to 4.5% by weight.

2. The dehydrogenation catalyst of claim 1, wherein the catalyst is calcined at 500° C. to 900° C.

3. The dehydrogenation catalyst of claim 2, wherein the catalyst is calcined at higher than 650° C. and lower than 800° C.

4. The dehydrogenation catalyst of claim 1, wherein zinc is supported at a molar ratio of 0.1 to 2.5 with respect to cobalt.

5. The dehydrogenation catalyst of claim 4, wherein zinc is supported at a molar ratio of 0.5 to 2.5 with respect to cobalt.

6. A method for preparing the dehydrogenation catalyst according to claim 1, the method comprising the steps of:

preparing a mixed solution by mixing cobalt and zinc precursors with water;

preparing a supported catalyst by impregnating alumina with the mixed solution;

drying the supported catalyst; and calcining the dried supported catalyst at 500° C. to 900° C., wherein cobalt is supported on the dehydrogenation catalyst in an amount of 3 to 4.5% by weight.

7. The method of claim 6, wherein the catalyst is calcined at higher than 650° C. and lower than 800° C.

8. The method of claim 6, wherein zinc is supported at a molar ratio of 0.1 to 2.5 with respect to cobalt.

9. The method of claim 8, wherein zinc is supported at a molar ratio of 0.5 to 2.5 with respect to cobalt.

10. A dehydrogenation catalyst for producing olefins from alkane gases, in which cobalt and zinc are supported on alumina, wherein the catalyst is calcined at higher than 650° C. and lower than 800° C., and wherein cobalt is supported in an amount of 3 to 4.5% by weight.

11. The dehydrogenation catalyst of claim 10, wherein zinc is supported at a molar ratio of 0.1 to 2.5 with respect to cobalt.

12. The dehydrogenation catalyst of claim 11, wherein zinc is supported at a molar ratio of 0.5 to 2.5 with respect to cobalt.

* * * * *